L. FLACHSKAMPF.
MICROMETER CALIPERS.
APPLICATION FILED DEC. 26, 1918.
1,419,837.
Patented June 13, 1922.
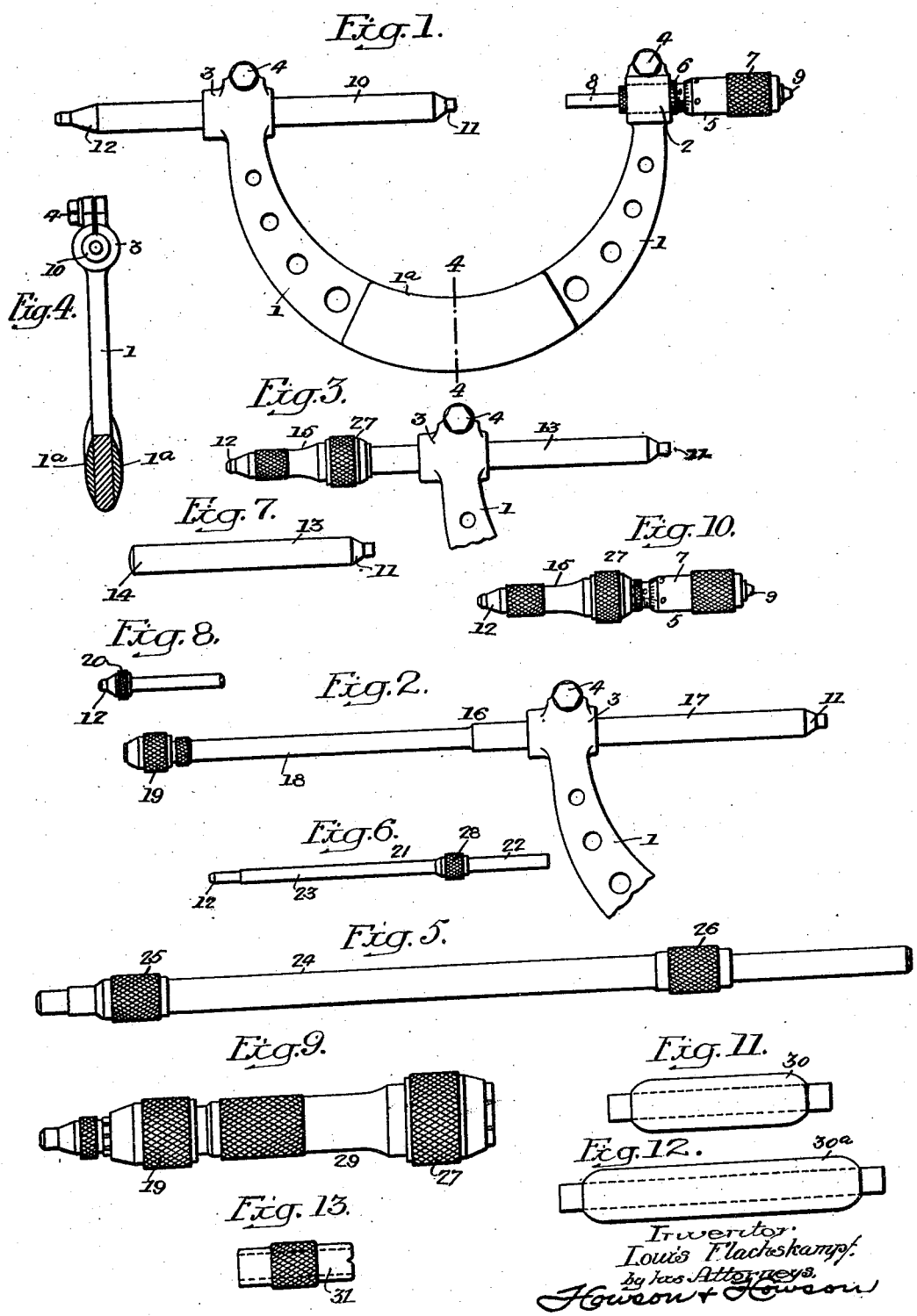
Inventor:
Louis Flachskampf
by his Attorneys
Howson + Howson

UNITED STATES PATENT OFFICE.

LOUIS FLACHSKAMPF, OF LOST CREEK #2, PENNSYLVANIA.

MICROMETER CALIPERS.

1,419,837.  Specification of Letters Patent.  Patented June 13, 1922.

Application filed December 26, 1918. Serial No. 268,338.

*To all whom it may concern:*

Be it known that I, LOUIS FLACHSKAMPF, a citizen of the United States, residing in Lost Creek #2, Pennsylvania, have invented the Micrometer Calipers, of which the following is a specification.

One object of this invention is to provide micrometer calipers especially designed and constructed to permit of making both inside and outside measurements with a high degree of accuracy between relatively wide limits;—the invention contemplating the provision of certain conveniently interchangeable parts formed to cooperate with each other and with a single frame whereby such measurements may be made with the required accuracy at any point or between any limits between the extreme limits of the range of the instrument.

I further desire to provide a novel form of micrometer head adapted for coaction with the frame and with any of a number of anvil- or chuck rods, for making inside and outside measurements with the utmost precision.

The invention also contemplates a novel form of chuck rod particularly adapted for use with a micrometer head to provide a convenient instrument for use in making accurate inside measurements and also available for combination with the frame, anvil rod and micrometer head in making inside measurements of relatively larger diameters, Another object of my invention is to provide a novel form of anvil rod particularly adapted for use with a caliper frame and a micrometer head for making both inside and outside measurements with a high degree of accuracy, the invention including such an arrangement of parts as will permit of the use of any one of a set of gauge rods for adjusting the calipers for use in making accurate measurements between wide limits.

I further desire to provide an instrument of the character above noted whereby a micrometer head of relatively limited range may be utilized in making accurate measurements both of inside and outside diameters, between limits many times in excess of such range;—the construction being simple, substantial and of such a nature as to permit of the convenient and rapid adjustment of the various parts.

These objects and other advantageous ends I attain as hereinafter set forth, reference being had to the accompanying drawings, in which, Fig. 1 is a side elevation illustrating a micrometer caliper constructed in accordance with my invention;

Fig. 2 is a side elevation of part of the caliper frame showing one of the anvil chuck rods in position therein;

Fig. 3 is a fragmentary side elevation similar to Fig. 2, showing an anvil rod with its cooperating chuck rod;

Fig. 4 is a vertical section on the line 4—4, Fig. 1;

Figs. 5 to 8 inclusive are side elevations illustrating various forms of the anvil rods forming parts of my invention;

Fig. 9 is a side elevation showing a double chuck rod and one of its cooperating anvil rods;

Fig. 10 shows my micrometer head combined with a chuck rod to form an inside micrometer guage;

Figs. 11 and 12 are side elevations of gauge rods for use with the other parts of my invention; and Fig. 13 is a side elevation of an extension sleeve which may be employed for quickly changing the adjustment of the calipers.

Referring to the above drawings, 1 represents a relatively rigid frame of U-shaped or substantially semi-circular form, provided with vulcanized fibre side plates 1ª and having the extremities of its arms constructed to constitute tubular clamps 2 and 3, for which purpose they are split in or parallel with the plane of the frame and are each provided with a tightening bolt 4. One of these clamps 2 is designed to receive the cylindrical body portion of a micrometer head 5 which is of such a diameter as to closely fit into it when the clamping nut 4 is in a released position, there being at one end of said cylindrical portion a knurled flange or collar 6 for limiting and determining the position of the micrometer head in the frame.

The rotary barrel 7 of the micrometer head has fixed to it a flat ended rod or anvil 8 which extends through the body so as to project between the arms of the frame 1, and this barrel is peculiar in having its outer end formed to provide a second anvil 9 for use in making inside measurements. That end of the barrel 7 adjacent the collar 6 is bevelled and circumferentially graduated in the customary manner, as is also that stationary part of the cylindrical body which projects into said barrel.

For coaction with the micrometer head 5 I provide a number of separate anvils and anvil extensions, of which a simple form is illustrated in Fig. 1, as consisting of an elongated cylindrical rod 10 having its inner end 11 of reduced diameter and provided with a flat terminal face accurately formed at right angles to its center line. The diameter of this anvil rod is such that it will closely fit into the clamp 3 of the frame and may be gripped thereby in any adjusted position by setting up on the bolt 4. Its opposite end 12 is also of reduced diameter and while terminating in a flat face at right angles to its center line, has said face of considerably less area than the face on the opposite end, in order that it may be adapted for making inside measurements.

With the above described arrangement of parts, if it be assumed that the micrometer head has an extreme range of one inch and is graduated to indicate thousandths of an inch, the calipers may be set to make measurements of diameters between two and three inches for example, by adjusting the barrel of said micrometer head at zero, and then placing between its movable anvil rod 8 and the end of the anvil rod 10, a gauge rod 30 having a length of two inches, the bolt 4 of the clamp 3 being set up to grip said rod 10 when the ends of the gauge rod contact with its end and with the end of the anvil rod 8 of the micrometer. Since the distance between the rods 8 and 10 is now two inches, the barrel 7 may be turned or backed off to permit of the measurement of diameters between two and three inches and such measurements may be made with accuracy to less than a thousandth of an inch.

It is particularly to be noted that the anvil rod 10 is accurately made of a definite length, preferably of an even number of inches, so that when the instrument is set as above indicated, not only are the adjacent ends of the rods 8 and 10 at a definite distance apart but the outer extremities of the barrel 7 and of the rod 10 likewise are separated by a definite known distance.

The instrument may then be used to make inside measurements by adjusting the barrel 7 until the anvils or points 9 and 12 both contact with the two surfaces between which the distance is to be determined, and said distance may then be ascertained by adding the micrometer reading to the known length overall of the micrometer head when its two zero graduations coincide and adding to this the length of the gauge piece 30 or 30ª, etc., used and the known length of the anvil rod 10.

When it is desired to use the instrument solely for outside measurements, I may mount in the clamp 3 an anvil rod such as that indicated at 13, Fig. 7, having but one end 11 formed to coact with the rod 8 of the micrometer head. Obviously I may provide several of these anvil rods of different lengths and utilize them in making inside as well as outside measurements by mounting on their outer or rounded ends 14 a chuck rod 15 (Fig. 3). The latter is so constructed as to provide at one end a chuck 27 formed to fit upon and grip the anvil rod 13, while its outer end has its extremity 12 formed to coact with the anvil 9 of the micrometer head in making inside measurements. It is to be noted that the diameters of the body of the anvil rod 13 and of that part of the micrometer head which fits in the clamp 2 are identical, so that if it be desired to provide a relatively narrow range instrument for making inside measurements, the head 5 may be removed from the frame 1 and inserted in the chuck 27 of the chuck rod 15 as indicated in Fig. 10. The anvil 9 and the end 12 of said chuck rod may then obviously be used in the well known manner to make inside measurements by proper manipulation of the micrometer barrel.

In order to further increase the range of the micrometer I may utilize an anvil rod such as is shown at 16 in Fig. 2. This rod has a body portion 17 fitting the clamp 3 and its end 11 is formed to cooperate with the anvil rod 8 of the micrometer when it is desired to make outside measurements;—it being possible to set this rod in the clamp by means of any of a number of gauge rods such as those indicated in Figs. 11 and 12, so as to use the instrument to measure any diameters up to the full internal capacity of the frame 1. This anvil rod 16 outside of its body portion 17 which may be gripped by the clamp, is of reduced diameter as indicated at 18 and terminates in a chuck 19 for the reception of an anvil head 20, Fig. 8. The latter has an anvil point 12 designed to cooperate with the point 9 of the micrometer head in making inside measurements.

The capacity of the instrument for measuring inside diameters may be increased by providing one of any desired number of extension anvil rods of the form shown at 21 in Fig. 6 each of which has a portion 22 designed to fit into and be gripped by the chuck 19, and also has a body 23 of any desired definite length terminating in a point 12, formed to cooperate with the anvil 9 of the micrometer head as before described in making inside measurements. In Fig. 5 I have illustrated a form of extension anvil which is relatively heavier than that of Fig. 6 but is functionally the same and is designed for the measurement of greater lengths than the latter. This rod has two knurled portions 25 and 26 adjacent its ends instead of the one knurled portion 28 as in the case of the rod 21, to permit of its being conveniently grasped and held during the manipulations of the chuck 19.

For certain intermediate inside measurements I may mount one of the anvil rods 10 or 13 in the clamp 3 of the frame and apply to it a double chuck rod 29 (Fig. 9) having at one end a chuck 27 designed to fit on and grip the outer end of either of said anvil rods. The other end of this chuck rod has a second and smaller chuck 19 designed to receive the anvil head 20 or any one of a series of anvil rods such as those shown in Figs. 5 and 6, depending upon the diameters to be measured.

In any case it is to be noted that after the micrometer head 5 has been gripped in the clamp 2 of the frame with its flange 6 in contact with the same, the instrument may be set to measure outside diameters by mounting anvil rods such as 10, 13 or 17 in the clamp 3 and setting them at the desired distance from the anvil rod 8 by the use of the appropriate one of the gauge rods 30, 30ª of which there may be any desired number differing from each other in length by a constant amount—for example one inch. Such setting likewise adjusts the instrument for inside measurements since the anvil and chuck rods, etc., are preferably of definite known lengths, as are also the structures formed by combining any of the anvil rods with any of the chuck rods, it being necessary of course to move the rod as far as possible into the chuck.

If it be desired to quickly increase the range of the instrument for inside measurements by the unit amount, i. e., one inch, when a chuck rod such as those of Figs. 2 or 9 are in place in the frame, I may loosen the chuck 19, and after removing the anvil head or rod 20 or 21 as the case may be, place on the chuck engaging end of the latter a sleeve 31 (Fig. 13) having a length of one inch, so that said sleeve engages both a shoulder on the anvil and said chuck, and reinsert said end in the chuck. While the end 22 may then be gripped by setting up the chuck, the overall length of the chuck and anvil rods has been increased by one inch as desired.

From the above description it will be noted that I may conveniently set and use the instrument for both inside and outside measurements and quickly adjust it for accurate operation between any desired limits within a relatively great range.

I claim:

1. The combination of a substantially U-shaped frame; a micrometer mounted on one branch of said frame; an anvil rod mounted on the second branch of the frame; a double chuck rod mounted on the outer end of said anvil rod; and a second anvil rod supported by the chuck rod in position to cooperate with the micrometer in making inside measurements.

2. The combination of a U-shaped frame; a micrometer carried by one branch of said frame; an anvil rod carried by a second branch of the frame and having a chuck at one end; a second anvil rod removably mounted in the chuck and having a shoulder formed to normally abut thereon; with an extension sleeve adapted to fit on the anvil rod between the shoulder thereof and the chuck.

In witness whereof I affix my signature.

LOUIS FLACHSKAMPF.